(12) United States Patent
Yuhara et al.

(10) Patent No.: US 7,593,970 B2
(45) Date of Patent: Sep. 22, 2009

(54) DATA RECEIVING SYSTEM, DATA BROADCASTING SYSTEM, DATA RECEIVING METHOD AND DATA BROADCASTING METHOD

(75) Inventors: Hiromitsu Yuhara, Wako (JP); Masayuki Habaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 11/517,805

(22) Filed: Sep. 8, 2006

(65) Prior Publication Data

US 2008/0065673 A1 Mar. 13, 2008

(51) Int. Cl.
*G06F 17/30* (2006.01)

(52) U.S. Cl. ........................................ 707/201; 707/203

(58) Field of Classification Search ................. 707/102, 707/201, 203
See application file for complete search history.

(56) References Cited

U.S. PATENT DOCUMENTS

| | | | | |
|---|---|---|---|---|
| 5,594,661 A | * | 1/1997 | Bruner et al. | 725/87 |
| 5,926,108 A | * | 7/1999 | Wicks et al. | 340/7.21 |
| 5,926,816 A | * | 7/1999 | Bauer et al. | 707/8 |
| 6,043,738 A | * | 3/2000 | Stewart et al. | 340/447 |
| 6,047,263 A | * | 4/2000 | Goodwin, III | 705/20 |
| 6,137,549 A | * | 10/2000 | Rasson et al. | 725/37 |
| 6,178,461 B1 | * | 1/2001 | Chan et al. | 709/247 |
| 6,581,075 B1 | * | 6/2003 | Guturu et al. | 707/201 |
| 6,636,851 B1 | * | 10/2003 | Bamford et al. | 707/8 |
| 6,810,405 B1 | * | 10/2004 | LaRue et al. | 707/201 |
| 6,816,778 B2 | * | 11/2004 | Diaz | 701/200 |
| 2001/0043795 A1 | * | 11/2001 | Wood et al. | 386/69 |
| 2002/0023146 A1 | * | 2/2002 | Hiroki | 709/219 |
| 2003/0048418 A1 | * | 3/2003 | Hose et al. | 352/123 |
| 2003/0231596 A1 | * | 12/2003 | Hong | 370/252 |
| 2004/0215667 A1 | * | 10/2004 | Taylor et al. | 707/201 |
| 2006/0004806 A1 | * | 1/2006 | Kraft | 707/101 |
| 2006/0015545 A1 | * | 1/2006 | Ezra | 707/204 |

FOREIGN PATENT DOCUMENTS

JP 08340310 A * 12/1996
JP 2000330948 A * 11/2000

* cited by examiner

*Primary Examiner*—James Trujillo
*Assistant Examiner*—William Spieler
(74) *Attorney, Agent, or Firm*—Ditthavong Mori & Steiner, P.C.

(57) ABSTRACT

A data receiving system includes a receiver which is configured to receive broadcast data. The broadcast data includes live information data and announcement data. The live information data has live information relating to a place. The announcement data includes a time indicator and content information regarding contents of the live information data. A determining unit is configured to determine whether newly received live information data is new or not based on the time indicator.

21 Claims, 10 Drawing Sheets

DATA RECEIVING SYSTEM, DATA BROADCASTING SYSTEM, DATA RECEIVING METHOD AND DATA BROADCASTING METHOD

BACKGROUND OF THE INVENTION

1. Field of the Invention

The present invention relates to a data receiving system, a data broadcasting system, a data receiving method and a data broadcasting method.

2. Discussion of the Background

U.S. Pat. No. 6,816,778 discloses an event finder on a remote terminal for finding events such as movies, sports, weather, news and the like through a remote terminal such as a lap top computer, personal digital assistant (PDA) and vehicle navigation system with positioning capability. The event finder includes a display, a data terminal connected to the display for processing data, a navigation system for determining position of a user and a destination, and a transceiver for receiving event data from an event data server through a public communication system. The event data server is a service provider which provides event information including schedules of events to subscribed members of unlimited number. The data terminal associates the event data from the event data server with position information from the navigation system and retrieves event information based on a selection method specified by the user. The contents of this US patent are incorporated by reference in their entirety.

SUMMARY OF THE INVENTION

According to one aspect of the present invention, a data receiving system includes a receiver which is configured to receive broadcast data. The broadcast data includes live information data and announcement data. The live information data has live information relating to a place. The announcement data includes a time indicator and content information regarding contents of the live information data. A determining unit is configured to determine whether newly received live information data is new or not based on the time indicator.

According to another aspect of the present invention, a data broadcasting system includes a broadcast data generator and a broadcasting device. The broadcast data generator is configured to generate broadcast data. The broadcast data includes live information data and announcement data. The live information data has live information relating to a place. The announcement data includes content information regarding contents of the live information data and a time indicator based on which a system receiving the broadcast data determines whether newly received live information data is new or not. The broadcasting device is configured to broadcast the broadcast data.

According to further aspect of the present invention, a data receiving method includes receiving broadcast data including live information data having live information relating to a place; and announcement data including a time indicator and content information regarding contents of the live information data. The method further includes determining whether newly received live information data is new or not based on the time indicator.

According to the other aspect of the present invention, a broadcasting method includes generating broadcast data including live information data having live information relating to a place; and announcement data including content information regarding contents of the live information data and a time indicator based on which a system receiving the broadcast data determines whether newly received live information data is new or not. The method further includes broadcasting the broadcast data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

While the embodiments will be described in conjunction with the vehicle navigation system, it will be understood that the present invention is not limited to such a specific application. For example, the present invention can also be applicable to a portable data terminal such as a personal digital assistance (PDA) and a lap top computer. Further, the embodiments of the present invention will be described mainly with respect to an application for finding a movie, the basic concept is applicable to other types of event as well.

Figure 1:
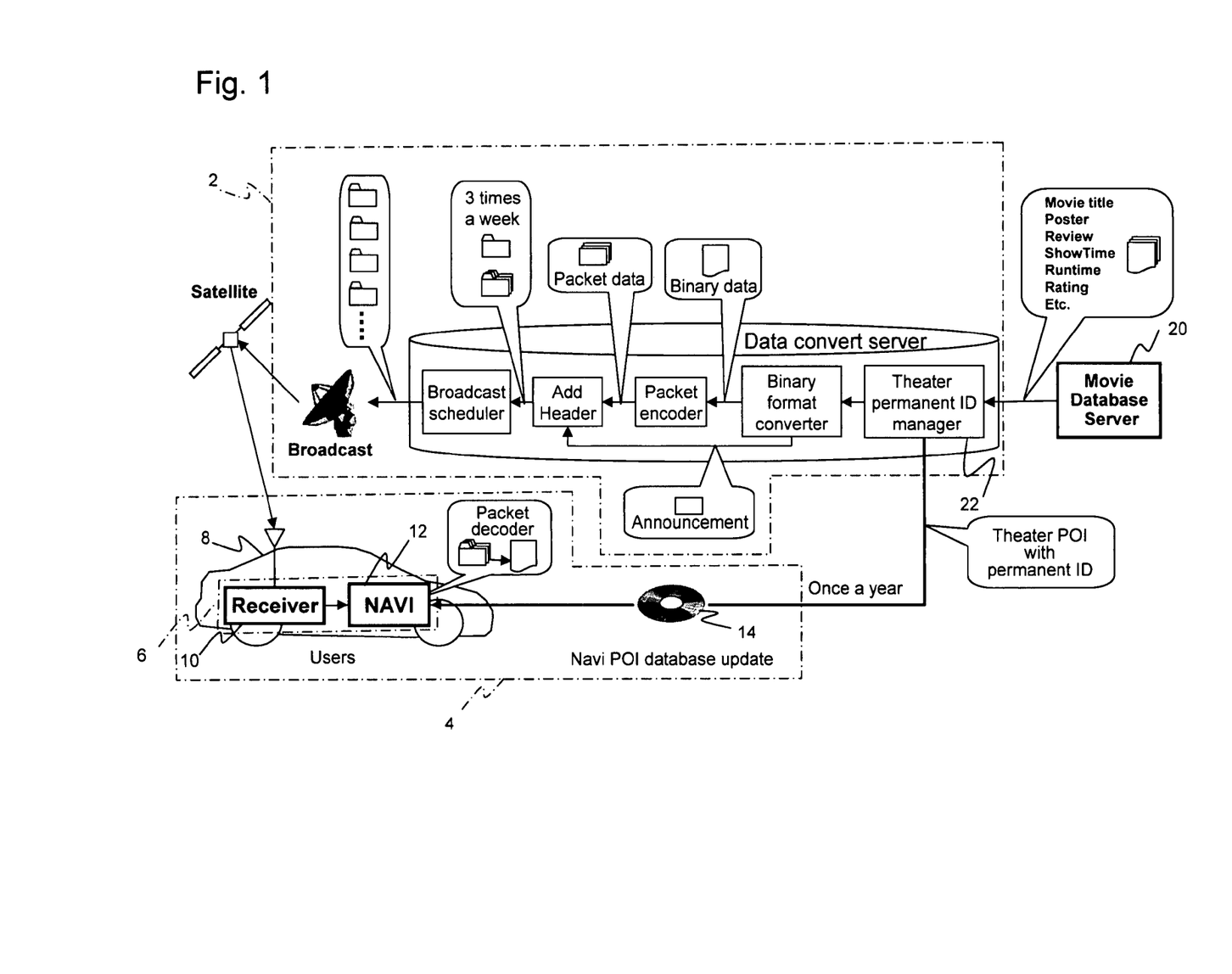
FIG. 1 is a schematic view showing an entire system according to an embodiment of the present invention.

FIG. 1 is a schematic view showing an entire system according to an embodiment of the present invention. Referring to FIG. 1, the entire system includes a data broadcasting system 2 and a data receiving system 4. The data broadcasting system 2 includes, for example, a satellite radio broadcasting. The data receiving system 4 includes, for example, a navigation system 6 provided in a vehicle 8. The navigation system 6 includes a receiver 10 and a navigator 12. The navigation system 6 navigates a driver of the vehicle to a place where the driver chose. The navigator 12 includes various database. An example of such database includes POI (Point Of Interest) information (stored data) which is read out from a memory, for example, a DVD 14, a hard disc or the like. The POI information includes, for example, the name, the address, the phone number, location information of the point of interest, for example, movie theaters, restaurants, airports and the like.

The data base does not include live information which changes, for example, on a daily basis or by the minute. For example, where the point of interest is a movie theater, the live information is, for example, the title of the movie which is currently shown, show time and the like. The live information data is broadcasted and the receiver 10 of the navigation system 6 receives the live information data. An example of a navigator may include a hand held GPS navigator, a portable vehicle navigator, a vehicle navigator fixed to the vehicle, and the like.

Figure 3A:
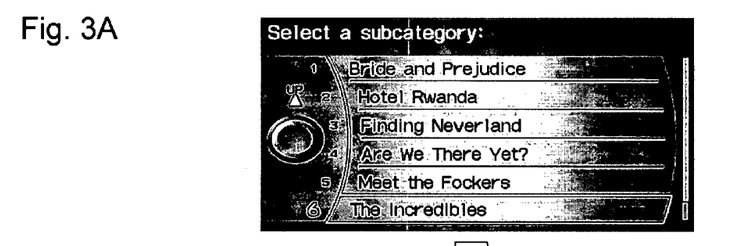
FIGS. 3A-3C show, for example, movie information shown in a display of the navigation system according to the embodiment of the present invention.
Figure 3B:
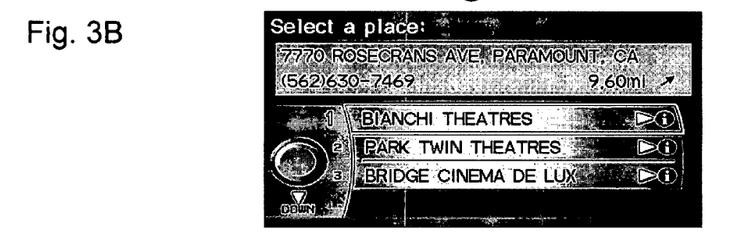
Figure 3C:
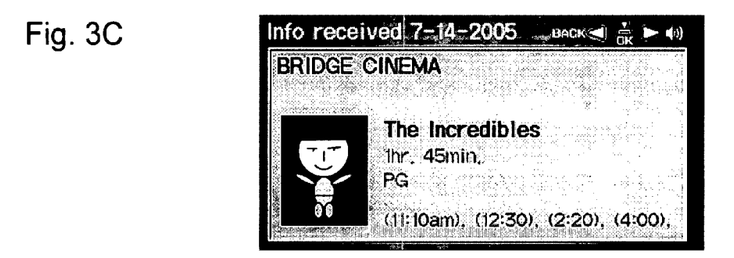

Movie information data, for example, movie title, show time, rating and the like are provided from a movie database server 20 to a theater permanent ID manager 22. The theater permanent ID management will be explained hereinafter referring to FIG. 3. The POI database is updated to have theater POI information with renewed permanent identification, for example, once a year.

Figure 2:
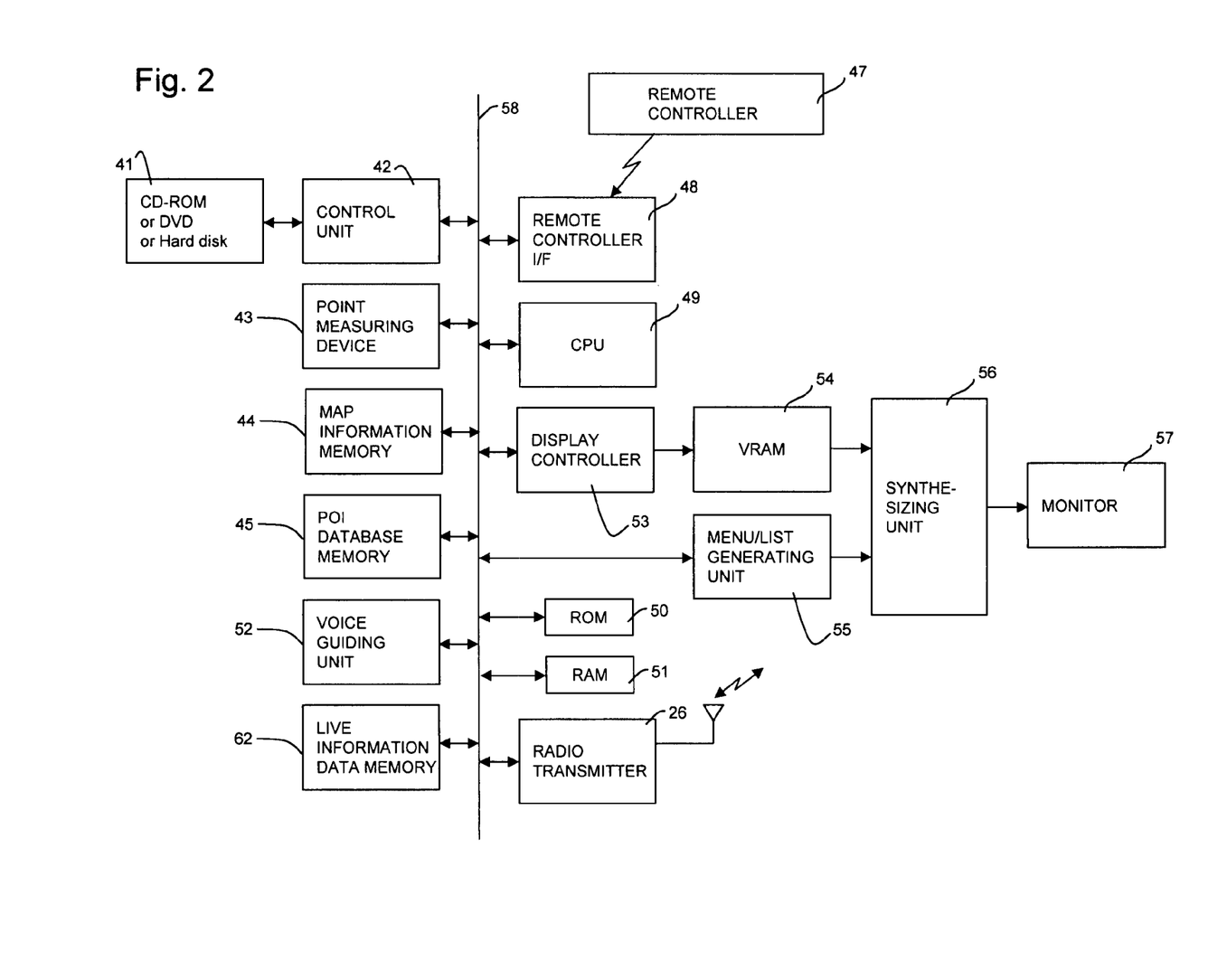
FIG. 2 shows an example of a structure in a navigation system according to the embodiment of the present invention.

FIG. 2 shows an example of a structure in the navigation system. In the block diagram of FIG. 2, the navigation system includes a map storage medium 41 such as a CD-ROM, a hard disc or a DVD (hereafter "DVD") for storing map information, a DVD control unit 42 for controlling an operation for reading the map information from the DVD, a point measuring device 43 for measuring the present vehicle position which has a vehicle speed sensor for detecting a moving distance, a gyro for detecting a moving direction, a microprocessor for calculating a position, a GPS receiver, and etc.

The navigation system includes a map information memory 44 for storing the map information which is read out from the DVD 41, a database memory 45 for storing database information such as point of interest (POI) information which is read out from the DVD 41. The navigation system includes a remote controller 47 for executing a menu selection operation, an enlarge/reduce operation, a destination input operation, etc. and a remote controller interface 48.

The navigation system further includes a processor (CPU) 49 for controlling an overall operation of the navigation system, a ROM 50 for storing various control programs such as a route search program, a map matching program necessary for navigation control and an event finder program for controlling an overall operation of the event finder, a RAM 51 for storing a processing result such as a guide route, a voice guiding unit 52 for guiding a traveling direction at a crossroad with spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, and a bus 58 for interfacing the above units in the system.

The navigation system further includes a live information data memory 62 for storing the live information data, a radio transmitter 26 which is typically a long-range wireless transceiver such as a satellite transceiver, FM subcarrier transmitter or a short-range wireless transmitter such as a Bluetooth transceiver, or other wireless transmitter. The radio transmitter 26 receives live information data. The radio transmitter 26 may further receive various vehicle parameters including mileage, gas levels, oil levels, an air bag sensor or a shock sensor to monitor the current conditions of the vehicle.

A data updating unit (CPU) is configured to update an updated portion of data stored in the navigation system.

A decoding unit (CPU) is configured to decode live information data from the beginning or in the middle of the live information data when the navigation system was turned off in the middle of the live information data while being decoded.

When the occupant of the vehicle wants to find, for example, a movie, the navigation system 6 can search not only the movie and the movie theaters, but also locations of the movie theaters, estimated arrival times, show times, effective routes to the selected movie theater and the like.

FIGS. 3A-3C show, for example, movie information shown in the display of the navigation system. FIG. 3A shows the list of the movie titles. For example, when one of the movie titles is selected, closest movie theaters which show the movie are displayed as shown in FIG. 3B. For example, when "BRIDGE CINEMA DE LUX" is selected, the information regarding the selected movie such as show times, rating and the like, are shown in the display as shown in FIG. 3C.

Figure 4:
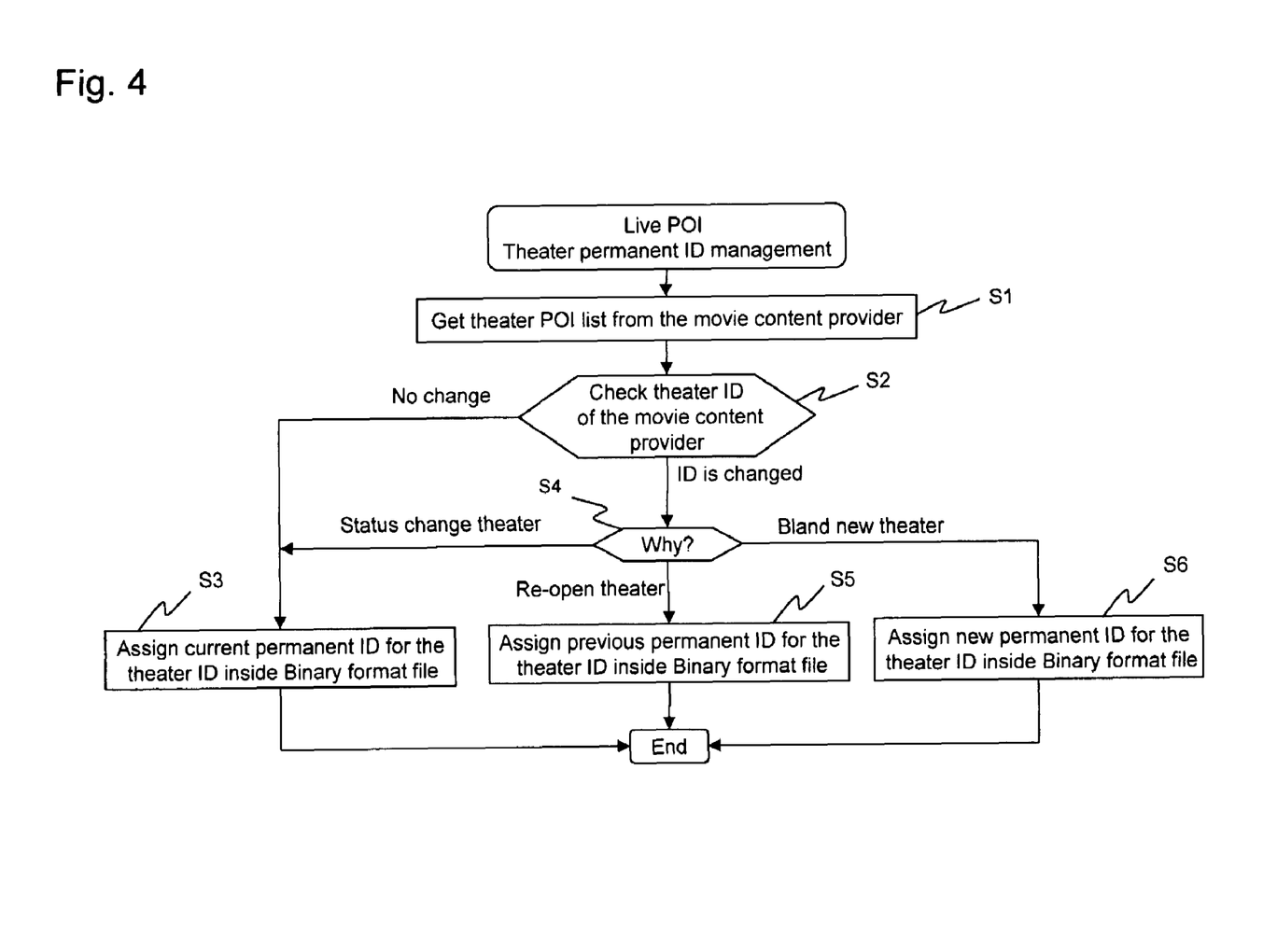
FIG. 4 shows a flow chart for managing a theater ID according to the embodiment of the present invention.

FIG. 4 shows a flow chart for managing the theater ID (identification). Referring to FIG. 4, at step S1, a theater POI list is obtained from the movie content provider. At step S2, it is determined whether the ID has been changed or not. When it is determined that the ID has not been changed, the current ID is assigned at step S3. When it is determined that the permanent ID has been changed, the reason of the change of the permanent ID is considered at step S4. If the reason of the ID change is that the status of the theater has been changed, the current permanent ID is assigned at step S3. If the reason of the ID change is that the theater has been reopened, the previous permanent ID is assigned at step S5. If the reason of the ID change is that a new theater has been opened, a new permanent ID is assigned at step S6.

Figure 5:
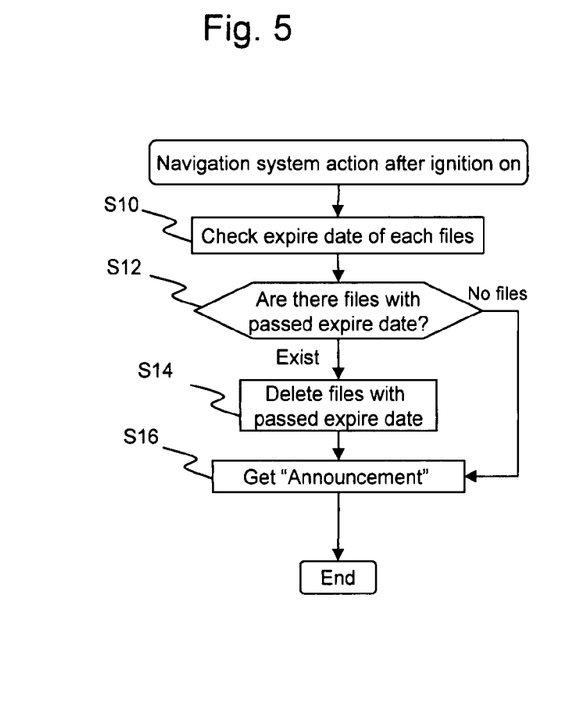
FIG. 5 shows a flow chart for managing expired files after an ignition switch has been turned on according to the embodiment of the present invention.

FIG. 5 shows a flow chart for managing expired files after an ignition switch has been turned on. Referring to FIG. 5, at step S10, the expiring date of each data file which was delivered via the satellite broadcasting and stored in the memory of the navigation system is checked. At step S12, it is determined whether there are data files which have been expired. If it is determined that there is no expired data files, announcement is got in at step S16. On the other hand, if there are any expired data files, such expired data files are deleted from the memory at step S14 and then announcement is got in at step S16.

Figure 6:
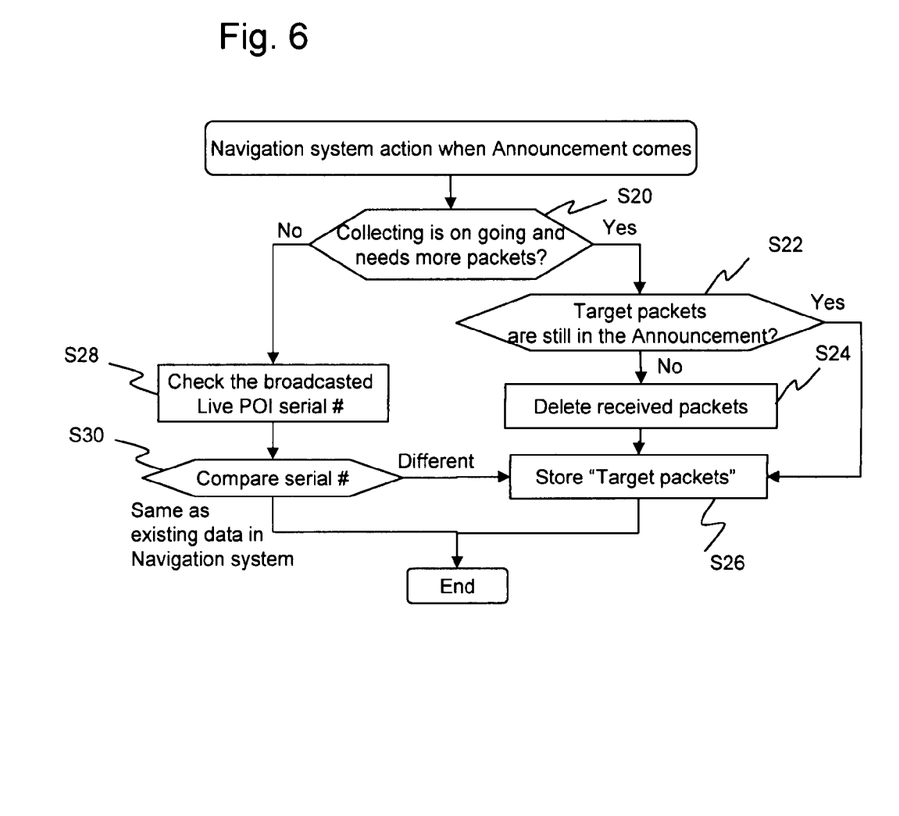
FIG. 6 shows a flow chart for processing broadcast data according to the embodiment of the present invention.

FIG. 6 shows a flow chart for processing broadcast data. Referring to FIG. 6, at step S20, it is determined whether more packets are necessary while receiving broadcast data. When it is determined that more packets are necessary, it is determined whether the announcement data includes necessary packets at step S22. Namely, for example, it is determined whether the announcement data includes new reference or new show time of the movie. When it is determined that the announcement data does not include necessary packets, the received packets are deleted at step S24. Namely, a data control unit (CPU) is configured to delete incomplete data which has not been received completely yet if the data control unit determines that the incomplete data is not being broadcasted.

When it is determined that the announcement data includes necessary packets, the necessary packets are stored at step S26. At step S20, when it is determined that no more packets are necessary while collecting announcement, the broadcasted live POI serial number is checked. At step S30, the broadcasted live POI serial number is compared to that of the existing data in the navigation system. If different, the necessary packets are stored at step S26. Namely, the data controller (CPU) is configured to determine by checking the live POI serial number whether broadcast data currently receiving is already received data which had been received, and a receiving controller (CPU) is configured to control the receiver to receive the broadcast data if the data controller determines that broadcast data currently receiving is not the already received data.

Figure 7:
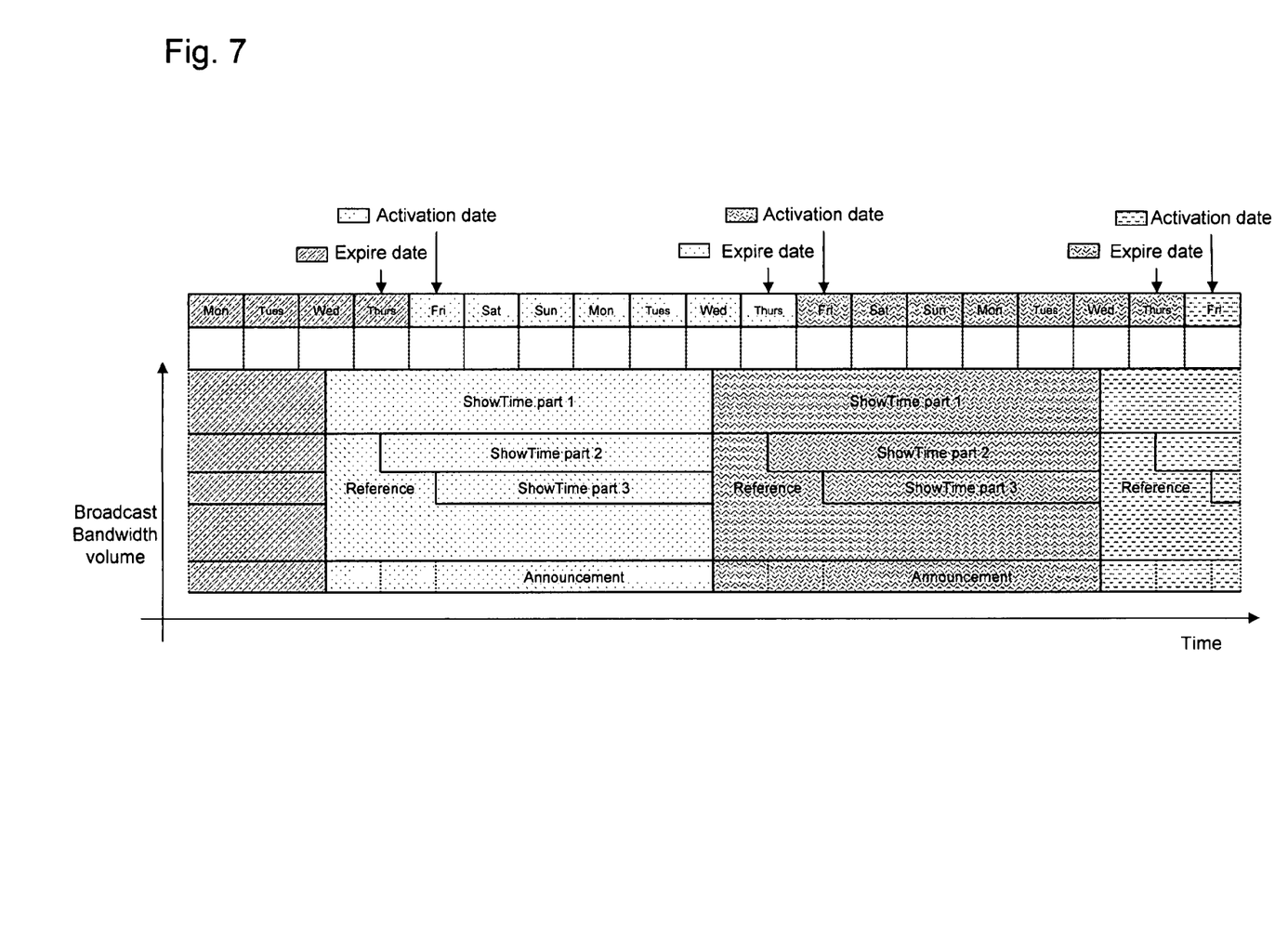
FIG. 7 shows a broadcast schedule of movie information.

FIG. 7 shows a broadcast schedule of movie information. Referring to FIG. 7, the "ShowTime part 1" includes data with respect to movie theaters where show time is updated by Wednesday. Similarly, the "ShowTime part 2" includes data with respect to movie theaters where show time is updated by Thursday, and the "ShowTime part 3" includes data with respect to movie theaters where show time is updated by Friday. Namely, the "ShowTime part 1", the "ShowTime part 2" and the "ShowTime part 3" constitute an entire show time data. The navigation system searches the entire show time data and display the search result. The information reference with respect to the movie itself is updated once a week. The announcement is updated every time when the contents of the broadcasting changes, for example, three times a week. If show time data, the information reference or the announcement includes errors, the number of updating increases. Only a certain theater, for example, the "ShowTime part 1" has been changed, the data of an entire week of the theater is broadcasted in the "ShowTime part 2" or "ShowTime part 3".

Figure 8:
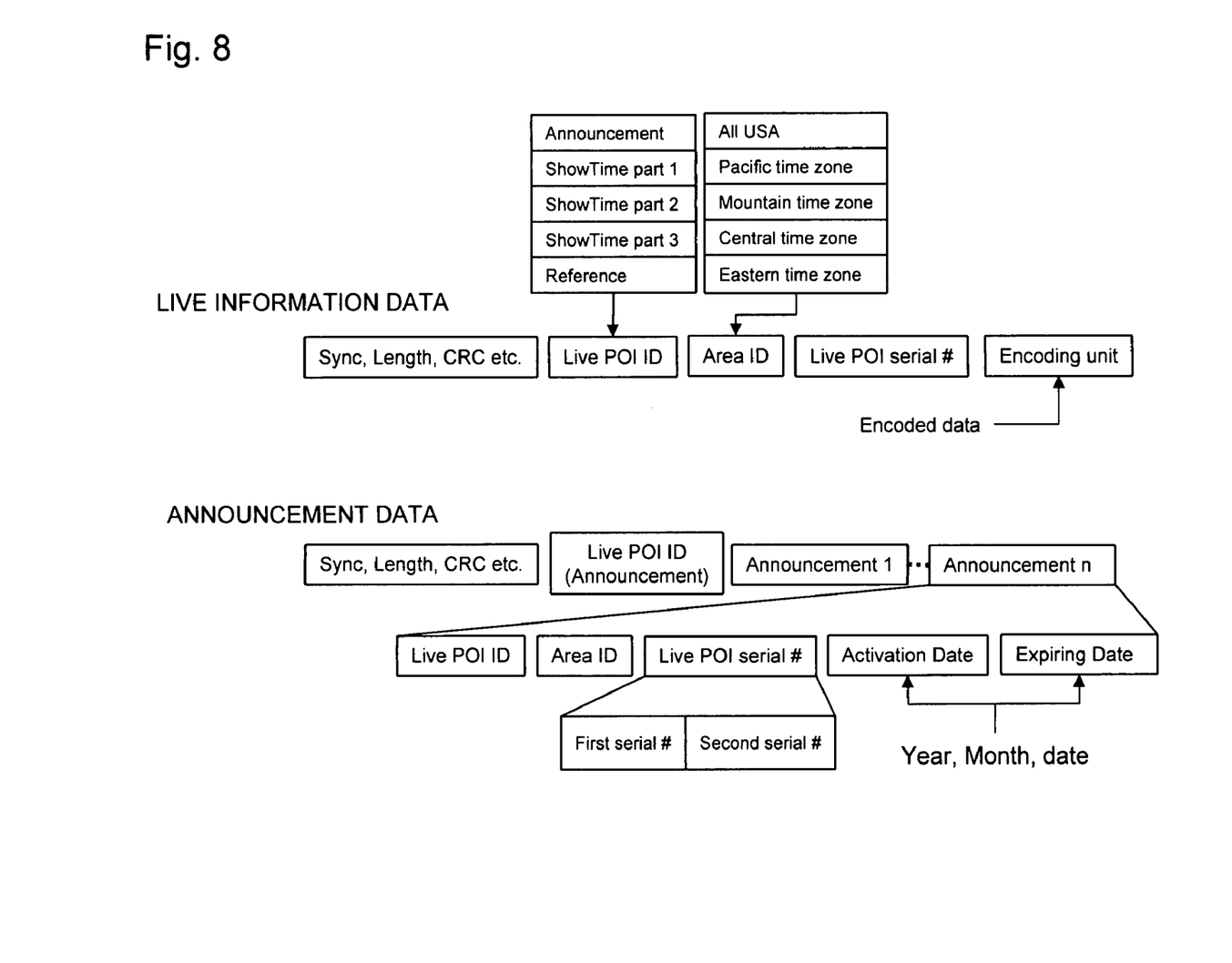
FIG. 8 shows a broadcast data format according to the embodiment of the present invention.

FIG. 8 shows a broadcast data format. Referring to FIG. 8, the broadcast data includes Live Information Data and Announcement Data. The Announcement Data includes a Live POI ID and announcements. Each announcement includes a Live POI ID, Live POI serial number, activation time, for example, activation date, and expiring time, for example, expiring date. The display controller is configured to control the display to show the live information data on or after the activation time of the live information data. The display controller is configured to control the display not to show the live information data on or after the expiring time of the live information data. The data controller is configured to delete the live information data on or after the expiring time of the live information data.

The broadcasting system is configured to start broadcasting the broadcast data on or before the activation time of the broadcast data or configured to stop broadcasting the broadcast data on or before the expiring time of the broadcast data.

The Live POI serial number includes a time indicator, for example, a first serial number and a second serial number. The first serial number is incremented every week. The second serial number is incremented every time when correction is broadcasted to correct errors contained in the previous broadcasting.

Figure 9:
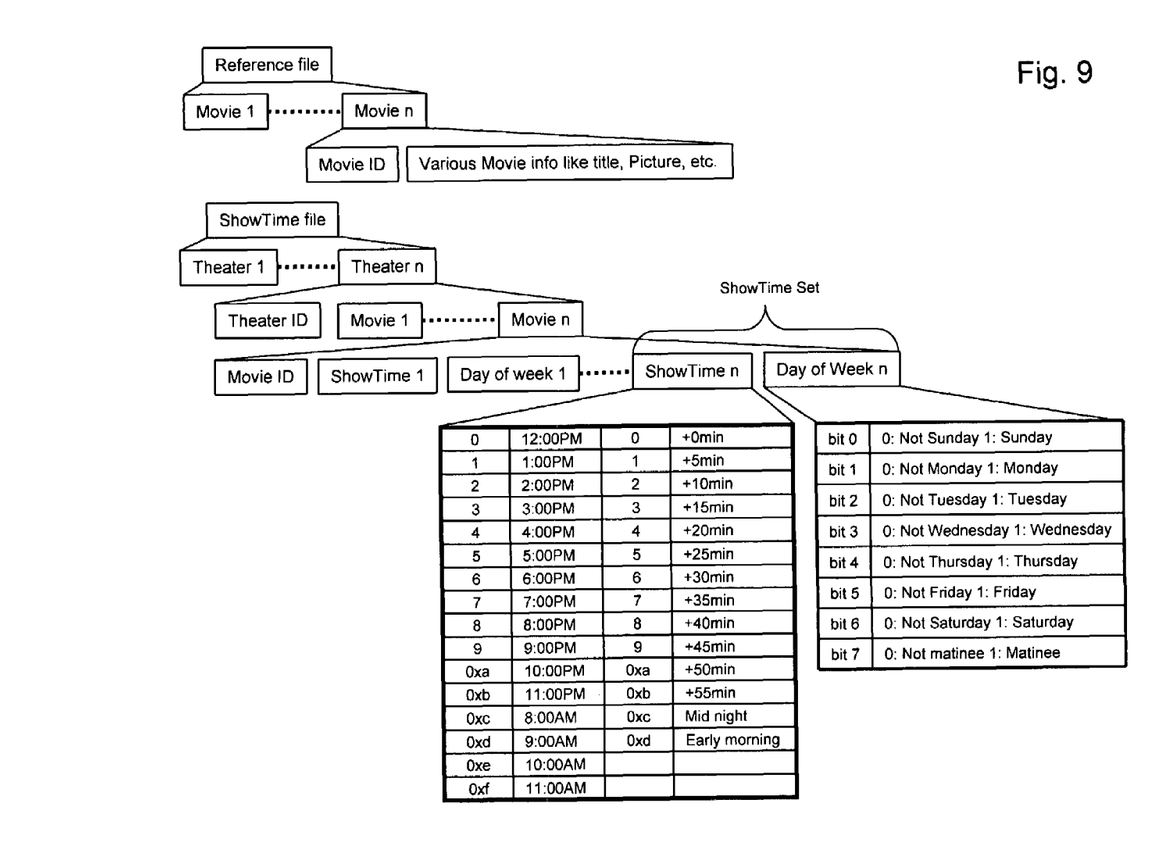
FIG. 9 shows an example of the data format of the movie information, the show time and the like according to the embodiment of the present invention.

The Encoded Data shown in FIG. 8 includes movie information data and show time data which have been encoded to packet data. An example of the data format of the movie information, the show time and the like which have not been encoded is shown in FIG. 9 and will be explained hereinafter. Also, the packet data will be explained hereinafter.

Referring to FIG. 9, a Reference File includes movie information data. A Show Time File includes at least one Show Time Set. The Show Time Set includes Showtime and Day of Week. When the second four bits (bit 4-7) is 0xC, the show time is only midnight. The Day of Week means days of week linked to the specific Show Time. For example, if the Show Time is applicable on Friday, Saturday and Sunday, bits 0, 5 and 6 are set to 1. If bit 7 is set to 1, the show time is matinee. If the show time is matinee on plural days, the bits corresponding to the plural days are set to 1 and bit 7 is set to 1 to save data size.

Figures 10A, 10B:
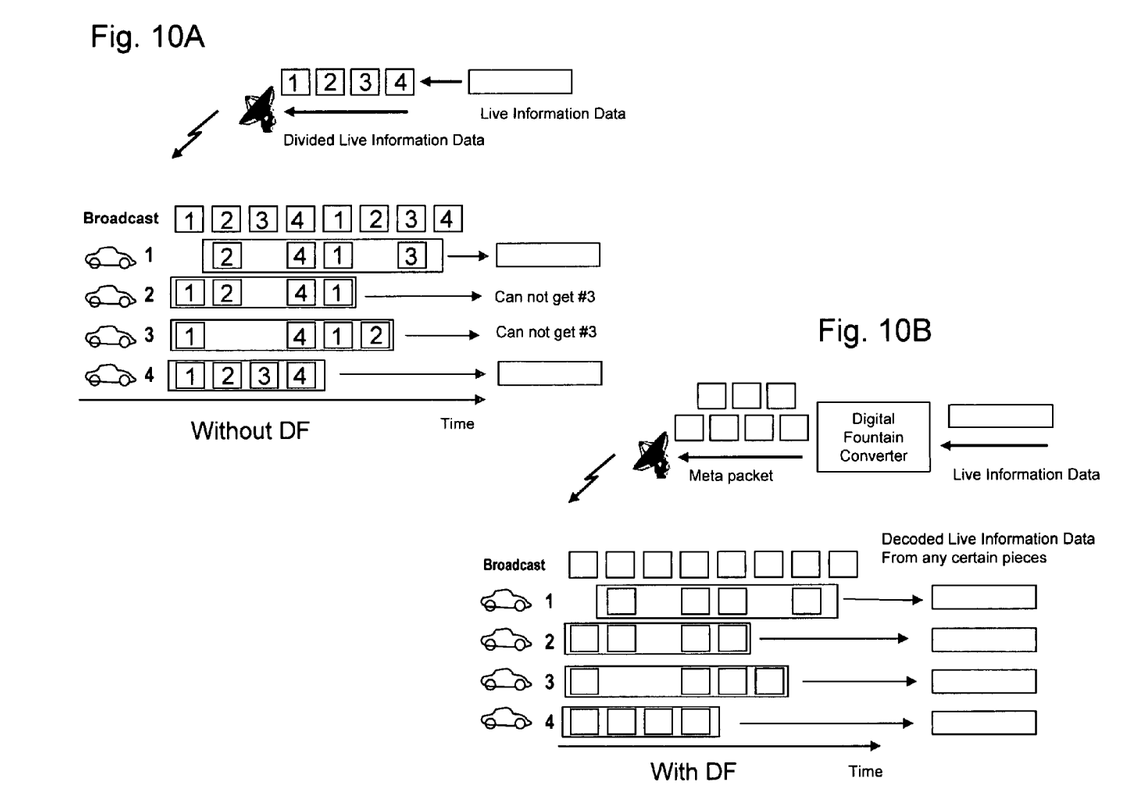
FIGS. 10A and 10B show an explanation of packet data.

FIGS. 10A and 10B show an explanation of the packet data. Referring to FIG. 10A, the live information data is divided to a plurality of packet data without using a Digital Fountain technology. In this case, the navigation system must receive all packet data 1, 2, 3 and 4 in order to reproduce the original live information data.

On the other hand, referring to FIG. 10B, the live information data is converted to meta packets using a Digital Fountain converter and the meta packets are broadcasted. The navigation system can reproduce the original live information data by receiving a certain number of packets, for example, four packets.

Figure 11:
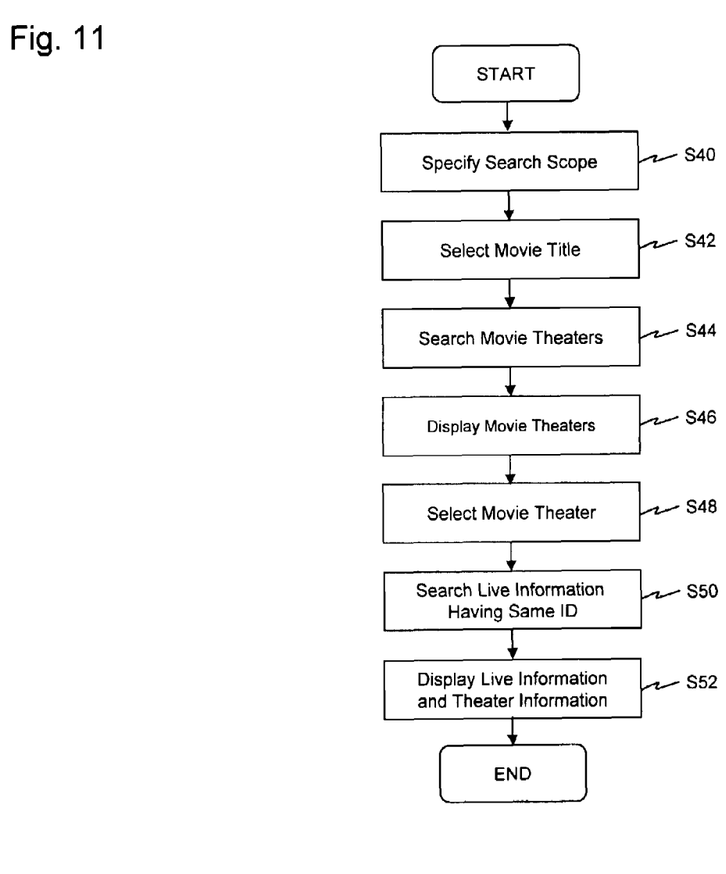
FIG. 11 shows a flow chart for showing movie information as illustrated in FIGS. 3A-3C.

FIG. 11 shows a flow chart for showing movie information as illustrated in FIGS. 3A-3C. Referring to FIG. 11, at step S40, a search scope is specified. A search is performed within the specified scope. For example, the navigation system searches movie theaters which are located within a predetermined distance, for example, 5 miles, from the present position. In another example, the navigation system searches movie theaters which are located within a predetermined travel time, for example, 15 minutes, from the present position.

At step S42, a movie title is selected from movie titles shown in the monitor (see FIG. 3A). At step S44, movie theaters which play such movie are searched in the live information data saved in the live information data memory 62 (see FIG. 2). At step S46, the names of the movie theaters saved in the POI database memory 45 (see FIG. 2) related to the live information data by the theater ID are displayed in the monitor (see FIG. 3B). Then, at step S48, a movie theater is selected from movie theaters shown in the monitor. At step S50, movie information, show time and the like are searched in the live information data saved in the live information data memory 62 (see FIG. 2) using the theater ID. Further, theater information, for example, the address and phone number of the theater, related to the live information data by the theater ID are retrieved from the POI database memory 45 (see FIG. 2). Then, at step S52, the theater information and the movie information are displayed in the monitor (see FIG. 3C).

According to the embodiment of the present invention, a data receiving system, for example, a navigation system includes a receiver which is configured to receive broadcast data. The broadcast data includes live information data and announcement data. The live information data has live information relating to a place. The announcement data includes a time indicator and content information regarding contents of the live information data. A determining unit (CPU) is configured to determine whether newly received live information data is new or not based on the time indicator. Accordingly, the data receiving system can efficiently receive live information data according to the contents of the announcement data.

According to the embodiment of the present invention, the navigation system includes stored data, for example, POI information which includes, for example, the name, the address, the phone number, location information of the point of interest, for example, movie theaters, restaurants, airports and the like. The live information data is broadcasted and the navigation system receives the live information data. The live information changes, for example, on a daily basis or by the minute. For example, where the point of interest is a movie theater, the live information is, for example, the title of the movie which is currently shown, show time and the like. Both the stored data and the live information data include identification. The live information is related to the stored data by using the identification.

Therefore, according to the embodiment of the present invention, broadcasting data can decrease, because the live information data without the POI information is broadcasted. Thus, the broadcasting band width can be efficiently utilized. Broadcasting cycle can be shortened, and a period of time during which the navigation system receive the entire live information data can be shortened.

The data broadcasting system may include a data separator which is configured to separate the live information data based on an update frequency of the live information data. The broadcasting device is configured to broadcast the separated live information data separately. According to this structure, the situation wherein the navigation system does not need to update one of the separated live information data occurs. Accordingly, processing amount of the navigation system can reduce.

The data broadcasting system may include a divider which is configured to divide the live information data based on geographical areas. Accordingly, the data receiving system does not need to receive live information data with respect to other areas.

Further, the data broadcasting system may includes a data updating unit which is configured to update a portion of the live information data, the broadcasting device being configured to broadcast the updated portion of the live information data.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A data receiving system comprising:
    a receiver configured to receive broadcast data that is updated and broadcast from a broadcaster, wherein the broadcast data is received by the receiver in a single transmission, the broadcast data comprising:
        live information data having live information relating to a place; and
        announcement data including a time indicator and content information regarding contents of the live information data, the time indicator including a first serial number incremented per predetermined time period and a second serial number incremented per each broadcasting of corrections to correct one or more errors in the broadcast data that was sent during a previous broadcast; and
    a determining unit configured to determine whether newly received live information data is new or not based on the time indicator.

2. The data receiving system according to claim 1, further comprising:
    a data control unit configured to delete incomplete data which has not been received completely yet if the data control unit determines that the incomplete data is not currently broadcasted.

3. The data receiving system according to claim 1, further comprising:
    a data controller configured to determine by checking the time indicator whether broadcast data currently being received is already received data which had been received; and
    a receiving controller configured to control the receiver to receive the broadcast data if the data controller determines that broadcast data currently being received is not the already received data.

4. The data receiving system according to claim 1, wherein the announcement data further comprises:
    at least one of activation time and expiring time with respect to the live information data.

5. The data receiving system according to claim 4, wherein the announcement data further comprises the activation time with respect to the live information data, and further comprising:
    a display controller configured to control a display to show one live information data on or after the activation time of said one live information data.

6. The data receiving system according to claim 4, wherein the announcement data further comprises the expiring time with respect to the live information data, and further comprising:
    a display controller configured to control a display not to show one live information data on or after the expiring time of said one live information data.

7. The data receiving system according to claim 4, wherein the announcement data further comprises the expiring time with respect to the live information data, and further comprising:
    a data controller configured to delete one live information data on or after the expiring time of said one live information data.

8. The data receiving system according to claim 1, further comprising:
    a data updating unit configured to update an updated portion of data stored in the data receiving system.

9. The data receiving system according to claim 1, further comprising:
    a decoding unit configured to decode the live information data from a beginning or in a middle of the live information data when the data receiving system was turned off in the middle of the live information data while being decoded.

10. The data receiving system according to claim 1, wherein the data receiving system includes a navigation system.

11. A data broadcasting system comprising:
    a broadcast data generator configured to generate broadcast data that is updated and broadcast from a broadcaster, the broadcast data comprising:
        live information data having live information relating to a place; and
        announcement data including content information regarding contents of the live information data and a time indicator based on which a system receiving the broadcast data determines whether newly received live information data is new or not, the time indicator including a first serial number incremented per predetermined time period and a second serial number incremented per each broadcasting of corrections to correct one or more errors in the broadcast data that was sent during a previous broadcast; and
    a broadcasting device configured to broadcast the broadcast data, wherein the broadcast data is broadcast in a single transmission.

12. The data broadcasting system according to claim 11, wherein the announcement data further comprises:
    at least one of activation time and expiring time with respect to the live information data.

13. The data broadcasting system according to claim 12, wherein the broadcasting device is configured to start broadcasting the broadcast data on or before the activation time of the broadcast data or configured to stop broadcasting the broadcast data on or before the expiring time of the broadcast data.

14. The data broadcasting system according to claim 11, further comprising:

a divider configured to divide the live information data based on geographical areas.

15. The data broadcasting system according to claim 11, further comprising:
a data updating unit configured to update a portion of the live information data, the broadcasting device being configured to broadcast the updated portion of the live information data.

16. A data receiving system comprising:
receiver means for receiving broadcast data that is updated and broadcast from a broadcaster, wherein the broadcast data is received by the receiver means in a single transmission, the broadcast data comprising:
live information data having live information relating to a place; and
announcement data including a time indicator and content information regarding contents of the live information data, the time indicator including a first serial number incremented per predetermined time period and a second serial number incremented per each broadcasting of corrections to correct one or more errors in the broadcast data that was sent during a previous broadcast; and
determining means for determining whether newly received live information data is new or not based on the time indicator.

17. A data broadcasting system comprising:
broadcast data generator means for generating broadcast data that is updated and broadcast from a broadcaster, the broadcast data comprising:
live information data having live information relating to a place; and
announcement data including content information regarding contents of the live information data and a time indicator based on which a system receiving the broadcast data determines whether newly received live information data is new or not, the time indicator including a first serial number incremented per predetermined time period and a second serial number incremented per each broadcasting of corrections to correct one or more errors in the broadcast data that was sent during a previous broadcast; and
broadcasting means for broadcasting the broadcast data, wherein the broadcast data is broadcast in a single transmission.

18. The data receiving system according to claim 1, wherein the live information data varies on a daily basis or by minute.

19. The data receiving system according to claim 1, wherein the live information data includes a title of a movie or show time of a movie.

20. A data receiving method comprising:
receiving broadcast data that is updated and broadcast from a broadcaster, wherein the broadcast data is received in a single transmission, the broadcast data including:
live information data having live information relating to a place; and announcement data including a time indicator and content information regarding contents of the live information data, the time indicator including a first serial number incremented per predetermined time period and a second serial number incremented per each broadcasting of corrections to correct one or more errors in the broadcast data that was sent during a previous broadcast; and
determining whether newly received live information data is new or not based on the time indicator.

21. A data broadcasting method comprising:
generating broadcast data that is updated and broadcast from a broadcaster, the broadcast data including:
live information data having live information relating to a place; and
announcement data including content information regarding contents of the live information data and a time indicator based on which a system receiving the broadcast data determines whether newly received live information data is new or not, the time indicator including a first serial number incremented per predetermined time period and a second serial number incremented per each broadcasting of corrections to correct one or more errors in the broadcast data that was sent during a previous broadcast; and
broadcasting the broadcast data in a single transmission.

* * * * *